United States Patent [19]

Domeier

[11] Patent Number: 4,812,511
[45] Date of Patent: Mar. 14, 1989

[54] ETHYLENICALLY-UNSATURATED ETHERS OF ALKENYL PHENOLS AS REACTIVE DILUENTS FOR BISMALEIMIDES

[75] Inventor: Linda A. Domeier, Windsor, Calif.

[73] Assignee: Amoco Corporation, Chicago, Ill.

[21] Appl. No.: 132,597

[22] Filed: Dec. 14, 1987

Related U.S. Application Data

[63] Continuation-in-part of Ser. No. 885,723, Jul. 15, 1986, abandoned.

[51] Int. Cl.$^4$ .......................... C08K 3/34; C08K 3/04; C08F 26/06
[52] U.S. Cl. .................................... 524/850; 524/700; 524/492; 524/495; 526/259; 526/262
[58] Field of Search ................ 526/259, 262; 524/492, 524/495, 700, 850

[56] References Cited

U.S. PATENT DOCUMENTS 4,654,407  3/1987  Domeier .............................. 526/262
4,689,378  8/1987  Chaudhari ........................... 526/259

Primary Examiner—Christopher Henderson
Attorney, Agent, or Firm—Richard J. Schlott; William H. Magidson; Ralph C. Medhurst

[57] ABSTRACT

Ethylenically-unsaturated ethers of alkenyl phenols are useful as reactive diluents for bismaleimides. Formulations comprising bismaleimides and the reactive diluents of this invention are particularly useful for producing heat and moisture resistant fiber-reinforced composites.

8 Claims, No Drawings

ETHYLENICALLY-UNSATURATED ETHERS OF ALKENYL PHENOLS AS REACTIVE DILUENTS FOR BISMALEIMIDES

CROSS-REFERENCE TO RELATED APPLICATIONS

This application is a Continuation-in-Part of Ser. No. 885,723, filed July 15, 1986, now abandoned.

BACKGROUND OF THE INVENTION

This invention relates to novel reactive diluents for use with bismaleimide formulatioss, and more particularly to ethylenically-unsaturated ethers of alkenyl phenols as novel reactive liquid diluents, and to thermosetting bismaleimide formulations comprising bismaleimides and the novel reactive diluents of this invention. The bismaleimide formulations of this invention, when cured, exhibit improved moisture resistance and are particularly useful in combination with fiber reinforcement for producing heat and moisture resistant composites. The novel reactive diluents of this invention provide bismaleimide formulations having improved miscibility and compatability with conventional modifiers including thermoplastic resins, cyanates and the like, and such formulations have a particularly advantageous range of melt viscosities and reactivities.

High strength, high modulus composites are finding increasing use as structural components for use in aircraft, automotive and sporting goods applications. Typically they comprise structural fibers such as carbon fibers in the form of woven cloth or continuous filaments embedded in a thermosetting resin matrix. Such composites may be conveniently fabricated from prepreg, a ready-to-mold sheet of reinforcement impregnated with uncured or partially cured matrix resin. Resin systems comprising an epoxide resin and aromatic amine hardener are often used as the matrix resin component of prepreg because they possess an appropriate balance of properties for this composite fabrication process. Although the resulting composites have high compressive strengths, good fatigue characteristics, and low shrinkage during cure, most epoxy formulations absorb moisture and are not well-suited for use at 270° F. or greater in a moisture-saturated condition.

Composites designed for use at temperatures of 300° F. or higher may employ as the matrix resin a combination of a bismaleimide with one or more coreactants such as polyfunctional amines, epoxides, cyanate resins, or comonomers containing polymerizable ethylenic unsaturation. Compositions based on liquid or low-melting solid coreactants and reactive diluents are particularly useful in the production of prepreg materials. A variety of such bismalemide-based formulations are now known, and a number are available from commercial sources.

The range of reactive diluents suitable for use with bismaleimide resins is rather limited. The use of vinyl ether diluents with bismaleimide resins in forming rapid-cure molding resin formulations is disclosed in U.S. Pat. No. 4,609,705. Such formulations gel and cure very quickly, and prepreg based on such formulations would therefore have a brief processing life or "out time". In U.S. Pat. Nos. 4,644,039 and 4,100,140 there are disclosed bis-unsaturated coreactants including diallyl-substituted bispenol A, diallyl-substituted biphenol, diallyl phthalate, triallyl cyanurates and the like, as well as alkenyl phenols such as 2-methoxy-4-allyl phenol (eugenol), and 2-allyl phenol. Also disclosed are the corresponding alkyl ethers, and particularly the methyl ethers, of these alkenyl phenols. Although the corresponding alkenyl ethers are also suggested in general terms in the disclosure of U.S. Pat. No. 4,100,140, there is no specific disclosure or example of such alkenyl ethers. Bismaleimide compositions incorporating a variety of such alkenyl phenols and their use in preparing composites are also disclosed.

Although other liquid diluents are available, including divinyl benzene, esters of acrylic and methacrylic acids and the like, many are highly volatile, have a noxious odor and may be toxic or strong irritants. Some are only poorly miscible with most bismaleimides, and those having reactive hydroxyl or amino functionality may induce rapid crosslinking and premature gellation of the bismaleimide or interact unfavorably with other components of the formulations.

The range of reactive diluents available for use with bismaleimides is thus rather limited, and coreactants and reactive liquid diluents that increase the options available to the resin formulator are clearly needed. Such diluents, particularly if they offer a range of reactivities and viscosities together wth improved miscibility with thermoplastics and compatibility with other commonly used additives and modifiers, would increase the flexibility needed to provide formulations designed to meet the needs of particular end users. In addition, the industry continues to require materials with the ability to withstand ever more severe environments, including elevated temperatures and exposure to extremes of moisture.

SUMMARY OF THE INVENTION

This invention relates to reactive diluents for use with bismaleimides and to curable formulations comprising bismaleimides and the reactive diluents of this invention.

The reactive diluents are compounds having a plurality of reactive olefinic functionalities, and are derived from alkenyl phenols such as eugenol. The reactive diluents may be more fully described as ethylenically-unsaturated ethers of such alkenyl phenols. These reactive diluents are liquids and are miscible with bismaleimides and with other components of bismaleimide-based formulations, forming compositions that are melt-processable. Formulations comprising bismaleimides and the reactive diluents of this invention may be useful as curable coating, casting, adhesive and impregnating resins and are particularly useful as matrix resins in combination with fiber reinforcement for producing curable prepreg, laminates and composites.

DETAILED DESCRIPTION

The reactive diluents useful in the practice of this invention are ethylenically-unsaturated ethers of alkenyl phenols, which may be more fully described and characterized as having the structure Alkenylphenyl-O-R, wherein R is an ethylenically-unsaturated moiety.

More specifically, the alkenylphenyl moiety will be derived from an alkenyl-substituted phenol, such as, for example, a propenylphenol or an allylphenol. Suitable alkenyl phenols may include the various position isomers of propenylphenol and allyl phenol as well as ring-substituted analogs thereof wherein the additional substituent groups will be those that do not react with bismaleimides or otherwise interfere with the curing process. Examples of such alkenyl phenols include $C_1$ to $C_4$ alkoxy-substituted compounds such as eugenol (2-methoxy-4-allyl phenol), isoeugenol (2-methoxy-4-propenyl phenol), 4-pro- penyl-2,6-dimethoxy phenol and 4-allyl-2,6-dimethoxyphenol, the $C_1$ to $C_4$ alkyl-substituted alkenylphenols such as the various allyl methylphenols, the allyl dimethylphenols, and the like, and halogen-substituted compounds such as 2-allyl-4-chlorophenol and the like, as well as the propenyl analogs thereof.

The ethylenically-unsaturated moiety R may be selected from allyl, vinylbenzyl, propenylbenzyl, allylbenzyl, and the like, as well as from structures having propenylphenoxy and allylphenoxy moieties linked to the alkenylphenol through a divalent hydrocarbon group such as an alkylene, alkenylene or bisalkarylene group. Examples of reactive diluents suitable for use in the practice of this invention include allyl ethers of alkenyl phenols such as the allyl ethers of eugenol and isoeugenol, the alkenyl benzyl ethers of alkenyl phenols such as the vinylbenzyl ethers of eugenol and isoeugenol, the di(alkenylphenyl) ethers of diols, including the bis-ethers of lower alkylene glycols and polyalkylene glycols such as 1,2-bis-(2-methoxy-4-allylphenoxy) ethane, the bis-ethers of ethylenically-unsaturated glycols such as 1,4-bis(2-methoxy-4-allylphenoxy)-2-butene, and the bisethers of alkarylene diols such as alpha,alpha'-bis(2-methoxy-4-allyl-phenoxy)-metaxylene and the like, as well as analogous compounds wherein the ethylenically unsaturated substituents are propenyl groups.

The reactive diluents of this invention may be prepared by a variety of well-known methods, including the etherification of alkenyl phenols with an appropriate ethylenically-unsaturated halogen compound, using an appropriate alkaline compound as an acid acceptor. For example, such allyl ethers may be prepared by combining any of the readily available allyl phenols such as 2-allylphenol or eugenol with an allylic halogen compound such as allyl chloride in the presence of sodium hydroxide and a suitable solvent, while use of phenols with propenyl ($\beta$-methylvinyl) substituents such as isoeugenol will afford the corresponding propenyl analogs. Similarly, the reaction of an alkenylene dihalide or an alkylene dihalide such as ethylene dibromide with an alkenyl phenol such as eugenol or isoeugenol will provide the corresponding bisalkenylphenyl ethers, while the combination of alkenyl phenols with benzylic halides such as chloromethylstyrene or an $\alpha,\alpha'$-dihaloxylene will provide the corresponding benzyl ethers and bis-ethers. The alkenyl phenols may be employed singly or in combination with other alkenyl phenols when carrying out such processes to provide a variety of useful product mixtures. Allylphenols not readily available commercially may be obtained by well-known processes, such as from the corresponding allyl phenyl ethers by a thermal isomerization process. These, in turn, may be isomerized to form the propenyl analogs.

The bismaleimides useful in the thermosetting formulations of this invention may be any of the bismaleimides derived from aromatic and aliphatic diamines, including any of the well-known and widely available phenylene diamines and the various diamino-substituted polynuclear aromatic compounds such as diaminodiphenyl sulfone, diaminobenzophenone, diaminodiphenylether, diaminodiphenylmethane, and like, as well as the various aryl compounds having a plurality of aminophenylalkylidene or aminophenoxy substituents. Also useful are bismaleimides based on $C_4$-$C_{20}$ aliphatic diamines such as the various isomeric alkanes having diamino substituents. The bismaleimides may be employed singly or in mixtures comprising two or more bismaleimides, which may include both aromatic and aliphatic bismaleimides. A great variety of bismaleimides suitable for use as matrix resins are well-known in the art, such as are recited for example in U.S. Pat. Nos. 4,644,039 and 4,100,140, as well as in applicant's recently issued U.S. Pat. No. 4,654,407. Methods for preparation of such bismaleimides are well-known, and many such resins and resin blends are available from commercial sources.

The bismaleimide formulations of this invention will comprise 100 parts by weight of the bismaleimide resin and from about 10 to about 200 parts by weight of the reactive diluent. The formulations will be readily prepared by simple mixing operations ordinarily employed in the resin formulating art, and may, if desired be compounded at moderately elevated temperatures to reduce the viscosity of the mixture.

The formulations may further include from 0 to about 30 wt. %, based on total resin formulation, of a thermoplastic polymer such as, for example, a polyaryl ether, a polyaryl sulfone, a polyarylate, a polyamide, a polyaryl ketone, a polyimide, a polyimide-ether, a polyolefin, an ABS resin, a polydiene or diene copolymer or a mixture thereof. Thermoplastics such as polysulfones and phenoxy resins are particularly miscible with the bismaleimidereactive diluent formulations of this invention, and may be used to adjust resin viscosity and control flow during cure, which is an important and unexpected advantage of these formulations. Compositions based on combinations of bismaleimides with prior art reactive diluents often have little or no miscibility with thermoplastic modifiers. These prior art formulations often exhibit poor tack and lack the viscosity characteristics needed for producing processable prepreg.

The formulations of the present invention may further include up to 50 wt. %, based on total resin formulation, of other reactive diluents and modifiers ordinarily employed in bismaleimide resin compositions, such as, for example, vinylic coreactants such as N-vinyl-2-pyrrolidinone, alkylene glycol vinyl ethers, vinyl toluene, styrene, divinyl benzene and the like, acrylates and methacrylates such as ethylene glycol dimethacrylate, acrylates and methacrylates of polyols such as trimethylol propane and pentaerythritol, allylic compounds such as triallyl isocyanurate, diallyl phthalate, tetraallyl pyromellitate, o,o'-diallyl bisphenol A, eugenol and the like. Other coreactive modifiers may also be included in the formulations of this invention, such as, for example epoxy resins, cyanate ester resins and mixtures thereof, together with appropriate curing aids and accelerators typically employed in formulating such curable compositions.

The formulations may also include 0 to 3 wt. % of one or more initiators for vinyl polymerization such as di-t-butyl peroxide, dicumyl peroxide, 1,1-bis(t-butylperoxy) cyclohexane, azo bis-isobutyronitrile, t-butyl perbenzoate, and the like. Inhibitors for vinyl polymerizations, such as hydroquinone, t-butyl hydroquinone, benzoquinone, p-methoxyphenol, phenothiazine, 4- nitro-m-cresol, and the like may also be employed in amounts of from 0 to 2 wt. %.

The bismaleimide formulations of the invention are particularly useful in combination with structural fiber for producing fiber reinforced laminates and composites and for the manufacture of prepreg. The structural fibers which may be used for these purposes include carbon, graphite, glass, silicon carbide, poly(benzothiazole), poly(benzimidazole), poly(benzoxazole), aluminum, titanium, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E.I. DuPont Company) and silicon carbide fibers. The composites will generally comprise from about 10 to about 90 wt. % fiber, based on total weight of composite.

Preimpregnated reinforcement, or prepreg, may be made by combining the resin formulations with a structural fiber, using any of the variety of methods known in the art such as wet winding or hot melt. Tacky, drapable prepreg tape or tow can be produced having a long prepreg out time at room temperature, typically one to four weeks.

The compositions of this invention may be used as matrix resins for composites, high temperature coatings, and adhesives. When reinforced with structural fibers, they may be used as aircraft parts as automotive parts such as drive shafts, bumpers, and springs, and as pressure vessels, tanks and pipes. They are also suitable for use in a wide variety of sporting goods applications such as golf shafts, tennis rackets and fishing rods.

In addition to structural fibers, the composition may also contain particulate fillers such as talc, mica, calcium carbonate, aluminum trihydrate, glass microballoons, phenolic thermospheres, and carbon black. Up to half of the weight of structural fiber in the composition may be replaced by filler. Thixotropic agents such as fumed silica may also be used.

EXAMPLES

The following examples serve to give specific illustrations of the practice of this invention but they are not intended in any way to limit the scope of this invention.

EXAMPLE 1

Allyl Ether of Eugenol (2-methoxy-4-allyl-1-allyloxybenzene)

A 5 l 4-neck flask equipped with an overhead stirrer, addition funnel, reflux condenser, nitrogen inlet and outlet, and heating mantle was charged with 2 l of n-propanol, 656.8 g of Eugenol, and 165.0 g of freshly opened sodium hydroxide pellets. The mixture was stirred and heated at reflux until the sodium hydroxide had dissolved.

Allyl chloride, 400 ml, was then slowly added over 20 minutes while gentle reflux was continued. The lemon yellow reaction mixture was then refluxed an additional 5 hours and stirred at room temperature overnight.

The precipitated sodium chloride was removed by filtration and the n-propanol was stripped under vacuum on a rotary evaporator. The crude product was diluted with 2 l of methylene chloride and that solution washed twice with water and twice with brine. The methylene chloride was removed under vacuum on a rotary evaporator and the product then filtered through sodium sulphate and held under vacuum overnight. The yield of liquid diluent was 811 g and the NMR was consistent with the expected structure. The boiling point of this diluent was over 250° C. at atmospheric pressure. The diluent was stable up to that temperature without polymerizing and, even when cured in the presence of a free radical inhibitor (see schedule A as discussed hereinbelow), showed only partial cure and could not be tested mechanically.

EXAMPLE 2

Vinylbenzyl Ether of Eugenol (VAD)

A 5 l 4-neck flask equipped with an overhead stirrer, thermometer and temperature controller, condenser, DeanStark trap, addition funnel, nitrogen atmosphere, and heating mantle was charged with 1 l of toluene, 1 l of DMSO, and 270 g of Eugenol. After flushing the stirred mixture with nitrogen for 15 min, a charge of 130.2 g of 50.32% aqueous sodium hydroxide was added and the funnel rinsed with additional water to insure transfer.

The reaction was heated to reflux and continued until all the water had been azeotropically removed plus 100 ml of additional toluene. After cooling the reaction mixture to 100° C., a 250.0 g portion of vinyl benzyl chloride was added followed by a toluene rinse. Heating at 100° C. was continued for 30 min. and the reaction mixture was then cooled to room temperature.

The reaction mixture was transferred to a 12 l stirred separatory funnel and diluted with 2 l of dichloromethane. This solution was washed with 3×2.5 l water, 1×2.5 l 5% aq. NaOH, and a final 2.5 l water. The washed organic solution was passed through silica gel and then inhibited with 0.46 g methoxyphenol, 0.46 g benzoquinone, and 0.46 g Eugenol. Several passes through a Pope molecular still were made to remove dichloromethane; the final residue weight was 401 g (83%). The proton and carbon NMR were consistent with the expected structure.

EXAMPLE 3

Di-Eugenol Ethers of Ethylene Glycol

A 2 l 3-neck flask equipped as in Example 1 (except no addition funnel) was charged with 164.3 g of Eugenol, 75.1 g of 1,2-dibromoethane, 124.4 g of potassium carbonate, and 1 l of acetone. The reaction was stirred and heated to reflux for about 18 hrs. to give a bright yellow slurry. The cooled reaction mixture was transferred to a separatory funnel, diluted with 1 l of dichloromethane, and washed with 4×1 l water, 1×1 l 0.5% NaOH, and 1 l water. The washed organic solution was passed through silica gel and the dichloromethane was removed under vacuum to give 37 g of a yellow oil. NMR analysis showed 66% of the expected diether and 34% unreacted Eugenol.

EXAMPLE 4

BMI Formulation with VAD (Example 2)

A mixture of 32 ml VAD and 68 g of SED-M BMI was blended and heated at 90° C. under vacuum in a rotary evaporator. After 15 min. a homogeneous mixture was discharged from the flask into two molds comprised of glass plates and a Teflon spacing frame. The larger mold measured about 10"×8"×⅛" and the small measured about 6"×4"×1/16". Both frames were about half filled.

The casting were cured according to the following schedule:
25°→100° C. at 1° C./min., hold 1 hr.
100°→180° C. at 1° C./min., hold 3 hrs.
180°→240° C. at 1° C./min., hold 3 hrs.
240°→275° C. at 1° C./min., hold 3 hrs.
275°→25° C. at 3° C./min.

The cured materials were then cut into samples for DMA and tensile strength testing. The composition had a Tg of 265° C., a tensile modulus of 542 ksi, tensile strength of 6.3 ksi, and an elongation of 1.25%. The materials absorbed 1.7–2.4% H₂O after 2 weeks immersion at 160° F.

EXAMPLE 5

BMI Formulation with VAD (Example 2)

A mixture of 6.8 g of SED-M BMI and 3.2 g VAD was blended on a rotary evaporator at about 125° C. until homogeneous. It was mixed and held under vacuum an additional 10 minutes for degasing and then poured into a small 1/16" thick casting frame such as that described in Example 4. The clear mixture was cured by heating in an oven according to the following schedule:
25°→100° C. at 1°/min., hold 1 hr.
100°→180° C. at 1°/min., hold 3 hrs.
180°→240° C. at 1°/min., hold 5 hrs.
240°→25° C. at 3°/min.

The cured casting had a Tg of 243° C. and absorbed 1.4% water after soaking 2 weeks at 160° F.

EXAMPLES 6–8

The procedure of Example 5 was substantially repeated using the ingredients listed in Table I. Heating temperatures ranged between 90° C. and 140° C. The cured castings gave Tg values and water absorption levels as listed in Table I.

TABLE I

| Example No. | BMI (gr.) | | Diluent (gr.) | | Tg (°C.) | H₂O Abs., % |
|---|---|---|---|---|---|---|
| 5 | SEDM | 6.8 | VAD | 3.2 | 243 | 1.4 |
| 6 | MDA | 5.0 | VAD | 5.0 | 310 | 1.9 |
| 7 | C353 | 5.45 | VAD | 5.0 | 300 | 2.1 |
| 8 | C353 | 6.8 | VAD | 3.2 | >300 | 2.3 |

Abbreviations:
SEDM = 4,4''-bis(3-maleimidophenoxy)diphenyl sulfone.
MDA = The bismaleimide of 4,4''-methylene dianiline.
C353 = Compimide 353, a mixture of aliphatic and aromatic bismaleimides from Boots-Technochemie GMBH.
VAD = Vinylbenzyl ether of Eugenol (Example 2).

Control examples were prepared using commonly employed coreactants in place of the reactive diluents of this invention, and tested as for Examples 5–8. The properties are summarized in Table II. The controls were cured substantially by the schedule of Example 5.

TABLE II

| Ex. No. | BMI (g.) | | Diluent (g.) | | Tg (°C.) | H₂O Abs., % |
|---|---|---|---|---|---|---|
| A | 7.5 | SEDM | 1.0 | NVP | 270 | 3.5 |
|   |     |      | 1.4 | EGDM |    |     |
| B | 5.4 | MDA | 4.6 | DABA | 284 | 3.7 |
| C | 8.2 | 353 | 0.4 | TAIC | >300 | 3.5 |
|   |     |     | 1.5 | DVB |     |     |

TABLE II-continued

| Ex. No. | BMI (g.) | | Diluent (g.) | | Tg (°C.) | H₂O Abs., % |
|---|---|---|---|---|---|---|
|   |     |      | 0.1 | PSF |    |     |
|   |     |      | 0.1 | PKHH |    |     |
| D | 7.0 | 353 | 3.0 | DAP | <200 | 5.1 |

Notes:
NVP = N—vinyl pyrrolidone; EGDM = ethylene glycol dimethacrylate; DABA = o,o'-diallyallylbisphenol A; TAIC = triallyl isocyanurate; DVB = divinyl benzene (55%); DAP = diallyl phthalate; see also notes to Table I.

It will be apparent from a consideration of the Examples that the compositions comprising bismaleimides and the reactive diluents of this invention, Examples 4–8, exhibit substantially improved resistance to moisture and, in many instances, substantially higher Tg values when compared with formulations based on commonly employed reactive diluents, summarized as control Examples A–D in Table II.

EXAMPLES 9–16

The procedure of Example 5 was substantially repeated using the ingredients listed in Table III. Heating was carried out at temperatures between 90° and 140° C.

The following cure schedules were employed as indicated in Table III:

| | Cure Schedules (°C.) | | |
|---|---|---|---|
| A. | 25 → 79 at 1.5°/min., | hold 2 hrs. | |
|    | 79 → 177 at 1.5°/min., | hold 4 hrs. | |
|    | 177 → 246 at 1°/min., | hold 4 hrs. | |
|    | 246 → 25 at 1.5°/min. | | |
| B. | 25 → 79 at 1.5°/min., | hold 6 hrs. | |
|    | 177 → 246 at 1°/min., | hold 4 hrs. | |
|    | 246 → 25 at 1.5°/min. | | |
| C. | 25 → 79 at 1.5°/min., | hold 2 hrs. | |
|    | 79 → 177 at 1.5°/min., | hold 4 hrs. | |
|    | 177 → 235 at 1°/min., | hold 4 hrs. | |
|    | 235 → 25 at 1.5°/min. | | |
| D. | 25 → 79 at 1.5°/min., | hold 2 hrs. | |
|    | 79 → 177 at 1.5°/min., | hold 4 hrs. | |
|    | 177 → 220 at 1°/min., | hold 4 hrs. | |
|    | 220 → 25 at 1.5°/min. | | |

TABLE III

| Ex. No. | BMI (g.) | | Diluent (g.) | | Cure | Tg (°C.) | H₂O Abs., % |
|---|---|---|---|---|---|---|---|
| 9 | SEDM | 7.4 | ECO | 2.6 | A | 280 | 2.6 |
| 10 | BAPP | 7.4 | ECO | 2.6 | A | 310 | 2.6 |
| 11 | BAM | 7.0 | ECO | 3.0 | B | 265 | 2.1 |
| 12 | TPE | 6.9 | ECO | 3.1 | B | 320 | 3.8 |
| 13 | C353 | 6.2 | ECO | 3.8 | A | 360 | 4.7 |
| 14 | C353 | 6.2 | ECO | 3.8 | C | 355 | 4.0 |
| 15 | C353 | 6.2 | ECO | 3.8 | D | 360 | 4.1 |
| 16 | C353 | 6.8 | ECO | 3.2 | C | 370 | 4.4 |

Note:
For test conditions, see text; abbreviations:
ECO = Allyl ether of Eugenol (Example 1);
SEDM = 4,4'-bis(3-maleimidophenoxy)diphenyl sulfone;
BAPP = 4,4'-bis(4-maleimidophenoxy)diphenyl isopropylidene;
BAM = alpha, alpha'-bis(4-maleimidophenoxy)-metadiisopropylbenzene;
TPE = 1,3-bis(4-maleimidophenoxy)benzene;
C353 = Compimide 353, a mixture of aliphatic and aromatic bismaleimides from Boots-Technochemie GMBH.

The Examples of Table III, when compared with the Control Examples of Table II, demonstrate the generally higher Tg values that result from formulations employing the reactive diluents of this invention.

EXAMPLES 17-27

The procedures of Example 5 were substantially followed in preparing and testing the compositions summarized in Table IV as Examples 17-27. The heating and stirring of the mixtures was accomplished at temperatures between 90° and 140° C. The cure schedules also were varied slightly as in the Examples of Table III.

TABLE IV

| Ex. No. | BMI (g.) | Diluent (g.) | BT Resin | (g.) | Cure | Tg (°C.) | $H_2O$ Abs., % |
|---|---|---|---|---|---|---|---|
| 17 | BAPP 7.0 | ECO 2.5 | U | 0.5 | B | 300 | 2.9 |
| 18 | BAPP 6.7 | ECO 2.3 | U | 1.0 | B | 292 | 3.0 |
| 19 | BAPP 6.7 | ECO 2.3 | M | 1.0 | B | 276 | 3.0 |
| 20 | BAPP 6.7 | ECO 2.2 | M | 1.5 | A,B | 270 | 2.7 |
| 21 | BAPP 5.7 | ECO 2.3 | M | 2.0 | A | 265 | 2.0 |
| 22 | TPE 6.2 | ECO 2.8 | U | 1.0 | B | 284 | 2.7 |
| 23 | C353 4.0 | ECO 2.4 | U | 3.6 | A | 258 | 2.9 |
| 24 | C353 6.0 | ECO 2.5 | M | 1.5 | A | ~280 | 4.3 |
| 25 | C353 6.5 | ECO 2.0 | M | 1.5 | A | ~300 | 4.5 |
| 26 | C353 6.25 | ECO 2.0 | M | 1.75 | A | ~300 | 3.9 |
| 27 | C353 6.0 | ECO 2.0 | M | 2.0 | A | ~270 | 4.7 |

Notes:
BT Resin: U = Unmodified BT2160 BMI-Cyanate resin based on MDA-BMI (10%) and bisphenol A dicyanate (90%); M = BT2164, a polyester elastomer-modified version of BT2160 (both BT resins were obtained from Mitsubishi Gas Chemical Company); for additional abbreviations, see text preceding Table I.

The compositions of Examples 17-27 demonstrate the utility of formulations including cyanate resins. Equivalent formulations based on o,o'-diallyl bisphenol A as the reactive diluent were also prepared; all were gelled and unusable.

EXAMPLES 28-37

The procedure of Example 5 was substantially repeated using the ingedients in Table V. The heating temperatures were between 90° and 140° C. In these examples the basic bismaleimide mixture was modified by the addition of rubbery thermoplastics.

TABLE V

| Ex. No. | BMI (g.) | Diluent (g.) | Modifier (g.) | Cure | Tg (°C.) | $H_2O$ Abs., % |
|---|---|---|---|---|---|---|
| 28 | 6.7 BAPP | 2.3 ECO | 1.0 VTBN | A | ~260 | 1.2 |
| 29 | 6.7 BAPP | 2.3 ECO | 1.0 CTBN | A | ~230 | 1.6 |
| 30 | 6.9 BAPP | 2.5 ECO | 0.6 PETP | A | ~300 | 2.6 |
| 31 | 6.9 BAPP | 2.3 ECO | 0.8 VTBN | A | ~320 | 2.3 |
| 32 | 6.2 TPE | 2.8 ECO | 1.0 CTBN | B | ~260 | 2.7 |
| 33 | 7.5 C453 | 2.5 ECO | (25% CTBN) | A | ~360 | 2.0 |
| 34 | 8.0 C453 | 2.0 ECO | (26% CTBN) | A | ~360 | 2.7 |
| 35 | 6.0 C453 2.0 C353 | 2.0 ECO | (20% CTBN) | A | ~360 | 3.3 |
| 36 | 6.0 C453 1.5 C353 | 2.5 ECO | (20% CTBN) | A | ~360 | 2.9 |
| 37 | 3.0 C453 3.6 C353 | 3.4 ECO | (10% CTBN) | A | ~350 | 2.4 |

Notes:
VTBN = Vinyl-terminated butadiene/acrylonitrile liquid rubber, VTBN 1300X22 (B. F. Goodrich Co.); CTBN = Carboxyl-terminated butadiene/acrylonitrile liquid rubber, either CTBN 1300X8 or CTBN 1300X13 (B. F. Goodrich Co.); PETP = a 50/50 blend of two thermoplastic elastomeric polyesters, LP-011 and LP-035, M.W. of each approx. 16,000 (Nippon Gosei, Japan); (wt % CTBN) = amount included with C453; C453 = 2 parts Compimide 353 and 1 part CTBN carboxyterminated nitrile rubber (Boots-Technochemie GMBH); see also notes to previous tables.

Examples 28-37 illustrate the particular advantages of ECO in providing processible resins with high levels (i.e., >10%) of rubber modifiers. The low viscosity of ECO is very useful in formulations of this type, and the high Tg values and low water uptake are notable for compositions having rubber contents of as great as 25 and 26% by weight.

EXAMPLES 38-42

The procedure of Example 5 was substantially repeated using the ingredients listed in Table VI. The heating temperatures were between 90° and 140° C. In these examples the bismaleimide/diluent mixture was modified by the addition of a rubbery thermoplastic polymer plus a BT resin.

TABLE VI

| Ex. No. | BMI (g.) | Diluent (g.) | Modifier | | Cure | Tg (°C.) | $H_2O$ Abs., % |
|---|---|---|---|---|---|---|---|
| 38 | 6.2 BAPP | 2.2 ECO | 1.0 0.6 | BT2160 PETP | A | 245 | 2.3 |
| 39 | 5.5 BAPP | 2.5 ECO | 1.0 1.0 | BT2160 VTBN | A | 200 | 1.3 |
| 40 | 5.9 BAPP | 2.1 ECO | 1.0 1.0 | BT2160 VTBN | B | 240 | 2.0 |
| 41 | 5.9 BAPP | 2.1 ECO | 1.0 1.0 | BT2160 CTBN | B | 215 | 3.2 |
| 42 | 6.25 C353 | 1.6 ECO | 1.75 0.4 | BT2164 PETP | A | ~290 | 4.0 |

Notes: For abbreviations, see notes to prior tables; for cure schedules, see text.

EXAMPLES 43-49

The procedure of Example 5 was substantially repeated using the ingredients in Table VII. Heating temperatures were between 90° and 140° C. Cure schedules and abbreviations are described above or in the table footnotes

TABLE VII

| Ex. No. | BMI (gr.) | Reactive Diluents (gr.) | (gr.) | Cure Sched. | Tg (°C.) | $H_2O$ Abs., % |
|---|---|---|---|---|---|---|
| 43 | 7.0 BAM | 1.5 ECO | 1.5 DABA | E | 295 | 1.4 |
| 44 | 7.0 BAM | 1.5 ECO | 1.5 DABS | E | 285 | 1.7 |
| 45 | 7.0 C353 | 1.5 ECO | 1.5 TM 120 | A | ~340 | 2.4 |
| 46 | 6.0 C353 | 2.5 ECO | 1.5 DABA | E | ~340 | 3.3 |
| 47 | 6.0 C353 | 2.5 ECO | 1.5 DABS | A | ~340 | 2.4 |
| 48 | 6.0 C353 | 2.0 ECO | 2.0 DABA | F | ~340 | 1.6 |
| 49 | 6.0 C353 | 2.4 ECO | 1.0 DABS | F | ~350 | 3.8 |

| Cure Schedules (°C.) | | |
|---|---|---|
| E. | 25 → 130 at 1.5°/min. | Hold 2 hrs. |
| | 130 → 177 at 1.5°/min. | Hold 4 hrs. |
| | 177 → 246 at 1°/min. | Hold 4 hrs. |
| | 246 → 25 at 1°/min. | |
| F. | 25 → 177 at 1.5°/min. | Hold 6 hrs. |
| | 177 → 246 at 1°/min. | Hold 4 hrs. |
| | 246 → 25 at 1°/min. | |

TM = a bis(allylphenyl) compound available as a BMI toughening modifier from Boots-Technochemie, GMBH.
DABS = o,o'-diallyl bisphenol S (Nippon Kagaku).

The above examples demonstrate the use of mixtures of the reactive diluents of this invention with commercially available diluents and BMI modifiers. The use of ECO, in particular, is advantageous in raising the Tg values of these formulations over those obtained with DABA or TM 120 alone. DABS is a powdered material, not a liquid, and could not be used as a single diluent in BMI formulations. In combination with ECO it provides high Tg values and low water uptake along with melt processability. Control examples summarized in Table vIII demonstrate the lower Tg values obtained in the absence of ECO.

TABLE VIII

| Control No. | BMI gr. | Diluent gr. | Cure Sched. | Tg (°C.) | H₂O Abs., % |
|---|---|---|---|---|---|
| E | 6.0 C353 | 4.0 DABA | F | 300 | — |
| F | 6.5 C353 | 3.5 DABA | F | 290 | 3.6 |
| G | 7.0 BAM | 3.0 DABA | A | 270 | 1.4 |

Tensile properties were obtained according to ASTM D-638 on larger castings (⅛" thick) made from some of the above formulations. These are listed in Table IX.

TABLE IX

| Ex. No. | Tg (°C.) | Tensile Strength | Tensile Modulus | Elong. |
|---|---|---|---|---|
| 33 | ~360 | 6.4 ksi | 326 ksi | 2.8% |
| 10 | 310 | 7.2 ksi | 463 ksi | 1.9% |
| 21 | 265 | 7.2 ksi | 495 ksi | 1.7% |

These properties show an attractive balance of toughness and high Tg values.

EXAMPLE 50

Dissolution of Polysulfone in ECO

A 2 l round bottom flask equipped with a thermometer, an overhead stirrer and nitrogen atmosphere was charged with 800 g of ECO. The stirred ECO was heated with an oil bath to 100° C. and 200 g of Udel P-1800 (powdered polysulfone available from Amoco Performance Products, Inc.) was added over 25 min. Stirring and heating were continued for 30 min. and the clear solution was then discharged. The P-1800/ECO solution was pourable at room temperature.

This Example demonstrates the ease of dissolution of a thermoplastic modifier in the diluent, ECO, alone. In contrast, the commercial diluent DABA (Ciba-Geigy) is only very slowly pourable at room temperature even in the absence of thermoplastic modifiers.

EXAMPLE 51

Preparation of Bismaleimide Formulation Using Pre-Blend of Polysulfone and ECO

A 3 l round bottom flask equipped with a thermometer, an overhead stirrer and a vacuum outlet was charged with 800 g of a pre-blend of 20 weight percent Udel P-1800 in ECO such as that prepared in Example 50. This 160 g P-1800/640 g ECO mixture was stirred and heated to 140° C. with an oil bath. A 1200 g charge of solid Compimide 353 (shattered into small pieces) was added over 15 min. Heating and stirring were continued under vacuum for 20 min. and the resin formulation was then discharged and let cool.

EXAMPLE 52

Fabrication of Prepreg Tow

The resin of Example 51 was applied via a hot-melt process to single tows of carbon fiber (either T-300 or T-40 from Amoco Performance Products, Inc.) and wound onto take-up creels as prepreg tow. After freezing and thawing, the tow showed excellent de-spooling characteristics and was readily re-wound into test specimens.

EXAMPLE 53

Preparation of Bismaleimide Formulation

A 3 l round bottom flask equipped with a thermometer, an overhead stirrer and vacuum outlet was charged with 640 g of ECO and the ECO was heated with an oil bath to 140° C. 1200 g of solid Compimide 353 (shattered into small pieces) was added over 15 min. During this addition and dissolution the temperature of the mixture dropped to about 100° C. The temperature of the mixture was raised to 140° C. again and 160 g of Udel P-1800 powdered polysulfone was added over 10–15 min. Vacuum was applied to the stirring, heated mixture for 30 min. and it was then discharged.

The formulation of this Example is identical to that of Example 51 except that the Udel P-1800 was dissolved in the ECO/Compimide 353 mixture instead of ECO alone.

Control Example H

A 250 ml round bottom flask equipped with a thermometer and overhead stirrer was charged with 33 g of DABA and the stirred DABA was heated to 120° C. with an oil bath. A 62 g charge of solid Compimide 353 (shattered into small pieces) was added over several minutes and dissolved. During this 25 min. period the temperature of the mixture dropped to 115° C. A 5 g charge of Udel P-1800 was then added. After stirring at 120° C. for about 1 hour, the P-1800 was still not dissolved. The temperature was raised to 130° C. After one hour, the P-1800 had still not dissolved but the resin had gelled and could not be removed from the flask.

This Control Example demonstrates the difficulties in preparing a 62/33/5 Compimide 353/DABA/P-1800 blend. By comparison Example 53, where a 60/32/8 Compimide 353/ECO/P-1800 blend was readily prepared, demonstrates one of the advantages of the diluents of this invention. It will thus be apparent from a consideration of Examples 17–27 and 28–37 and the corresponding control examples, as well as from Example 53 and Control Example H that the composition of this invention exhibits good miscibility and compatability with modifiers such as cyanates, rubbers, thermoplastics and the like.

EXAMPLE 54

Preparation of Bismaleimide Formulation

A 500 ml round bottom flask equipped with a thermometer, an overhead stirrer and a temperature controller was charged with 48 g of ECO. The ECO was stirred and heated to 70° C. with an oil bath. 120 g of Compimide 353 (shattered into small pieces) was added over 6 min. and the mixture was then heated to 110° C. The Comp. 353 had dissolved by the time the temperature reached 85° C. A 6 g charge of powdered phenoxy resin (PKHH, from Union Carbide Corp.) and a 6 g charge of Udel P-1800 were then added and the temperature raised to 120° C. After 90 minutes all the added materials were dissolved, and the mixture was charged with 20 g of diallyl bisphenol S (DABS) powder (Nippon Kagaku Co.). After mixing one hour at 120° C., the mixture was cooled to 110° C., stirred an additional hour, and then discharged.

A small casting prepared from this resin and cured according to schedule F gave a Tg of about 350° C.

The resin had excellent film properties and was readily fabricated into prepreg tape with carbon fibers and used to prepare composite samples.

EXAMPLE 55

Preparation of Bismaleimide Formulation

The procedure of Example 54 was substantially repeated except that the mixing time after addition of all the resin ingredients was reduced to 15 min. at 120° C. and the resin was then discharged. This resin had a lower viscosity and was well suited for the fabrication of prepreg tow as described in Example 52.

EXAMPLE 56

The procedure of Example 54 was substantially repeated using the following ingredients, in parts by weight:
Compimide 353—60 parts
ECO—21 parts
DABS—10 parts
Udel 3900—9 parts Udel 3900 is a lower molecular weight polysulfone resin available from Amoco Performance Products, Inc.

EXAMPLE 57

Preparation of Carbon Fiber Composite

A mixture of 1120 g of Compimide 353 bismaleimide, 680 g ECO, 200 g VTBN 1300X22, and 40 g Cab-o-Sil (N-70-TS, hydrophobic) was stirred at 125° C. until a film sample withdrawn showed good film properties and little or no reticulation. A total heating period of about 7 hours was used.

The resin mixture was coated on a differential silicone-coated release paper and then fabricated via standard prepregging procedures into a carbon fiber prepreg product using T-40 fibers (12K), available from Amoco Performance Products, Inc. An edge delamination test composite, $(\pm 25_2/90)_s$, was fabricated from this prepreg and gave an average edge delamination strength of 21 ksi. The Tg of the resin cured under similar conditions was ~350° C.

EXAMPLES 58-60

The procedure of Example 57 was substantially repeated using the resin compositions and fibers listed in Table X.

The composites were tested for edge delamination strength and gave the values shown. These results demonstrate the toughening effects of the polysulfone modifier in Example 60, the rubber modifier in Example 57, and the mixed phenoxy/polysulfone modifier in Example 59, compared with Example 58, containing no modifier.

TABLE X

| Example No. | Resin Compositions | Fiber | EDS (ksi) |
| --- | --- | --- | --- |
| 57 | Ex. 57 | T-40 | 21 |
| 58 | Ex. 47 | T-40 | 16 |
| 59 | Ex. 54 | T-650* | 21 |
| 60 | Ex. 56 | T-40 | 22 |

*T-650 fiber has properties similar to T-40 fiber.

The invention will thus be seen to be directed to the use of ethylenically-unsaturated ethers of alkenyl phenols as reactive diluents for bismaleimides and to compositions comprising bismaleimides and ethylenically-unsaturated ethers of alkenyl phenols. The curable bismaleimide formulations of this invention may comprise from 10 to 200 parts by weight of an ethylenically-unsaturated ether of an alkenyl phenol per 100 pbw of the bismaleimide. The formulations may further comprise from 10 to 90 wt. % structural fiber, preferably carbon fiber, from 0 to 50 wt. % of one or more additional co-reactants selected from epoxy resins, cyanate resins, and ethylenically-unsaturated monomers, and from 0 to 50 wt. % of one or more resin modifiers selected from thermoplastics, rubbery polymers and mixtures thereof. While the invention has been illustrated by various representative examples and embodiments, it will be apparent that further additions and modifications are possible without departing from the spirit and scope of the invention as set forth in the appended claims.

I claim:

1. A bismaleimide resin formulation comprising a bismaleimide and, as a reactive diluent, an ether of eugenol selected from the group consisting of the allyl ether of eugenol, the vinylbenzyl ethers of eugenol and the di-eugenol ethers of glycols.

2. The formulation of claim 1 comprising 100 parts by weight of said bismaleimide, and from 10 to 200 parts by weight of said reactive diluent.

3. A composition comprising 100 parts by weight of a bismaleimide and from 0 to 200 parts by weight of an ether of eugenol selected from the group consisting of the allyl either of eugenol, the vinylbenzyl ethers of eugenol and the di-eugenol ethers of glycols.

4. A curable bismaleimide formulation comprising:
   (a) from 10 to 90 wt. % of a mixture of 100 pbw of a bisimaleimide and from 10 to 200 pbw of a reactive diluent selected from the ethylenically-unsaturated ethers of eugenol;
   (b) from 10 to 90 wt. % of a structural fiber;
   (c) from 0 to 50 wt. % coreactants selected from the group consisting of epoxy resins, cyanate resins, curable ethylenicaly-unsaturated monomers and mixtures thereof; and
   (d) from 0 to 50 wt. % resin modifiers selected from thermoplatics, elastomers and mixtures thereof.

5. The formulation of claim 4 wherein the reactive diluent is selected from the group consisting of the allyl ether of eugenol, the vinylbenzyl ethers of eugenol and the di-eugenol ethers of glycols.

6. The formulation of claim 4 wherein said structural fiber is carbon fiber.

7. The formulation of claim 4 wherein said resin modifier is selected from the group consisting of polysulfone, butadiene-acrylonitrile copolymers, phenoxy resin, polyester elastomers and mixtures thereof.

8. The formulation of claim 4 wherein said resin modifier is a thermoplastic selected from the group consisting of polysulfones and phenoxy resins.

* * * * *

UNITED STATES PATENT OFFICE
CERTIFICATE OF CORRECTION

Patent No. 4,812,511            Dated March 14, 1989

Inventor(s) Linda A. Domeier

It is certified that error appears in the above-identified patent and that said Letters Patent is hereby corrected as shown below:

Col. 14, line 32, delete "0" and insert --10--.

Col. 14, line 34, delete "either" and insert --ether--.

Col. 14, line 38, delete "bisimaleimide" and insert --bismaleimide--.

Col. 14, line 47, delete "thermoplatics" and insert --thermoplastics--.

Signed and Sealed this

Twenty-third Day of January, 1990

Attest:

JEFFREY M. SAMUELS

Attesting Officer    Acting Commissioner of Patents and Trademarks